US012627118B2

(12) United States Patent
Cannady et al.

(10) Patent No.: US 12,627,118 B2
(45) Date of Patent: May 12, 2026

(54) IGNITION SYSTEM AND IGNITER HAVING RUTHENIUM GROUND ELECTRODE AND PLATINUM-IRIDIUM ALLOY CENTER ELECTRODE

(71) Applicant: Champion Aerospace LLC, Liberty, SC (US)

(72) Inventors: Steven J. Cannady, Liberty, SC (US); Thomas L. Justice, Anderson, SC (US); George D. Lambrinos, Fountain Inn, SC (US); Stanley K. Thompson, Liberty, SC (US)

(73) Assignee: Champion Aerospace LLC, Liberty, SC (US)

( * ) Notice: Subject to any disclaimer, the term of this patent is extended or adjusted under 35 U.S.C. 154(b) by 0 days.

(21) Appl. No.: 18/705,545

(22) PCT Filed: Sep. 19, 2023

(86) PCT No.: PCT/US2023/033093
§ 371 (c)(1),
(2) Date: Apr. 27, 2024

(87) PCT Pub. No.: WO2024/059350
PCT Pub. Date: Mar. 21, 2024

(65) Prior Publication Data

US 2025/0210943 A1 Jun. 26, 2025

Related U.S. Application Data

(60) Provisional application No. 63/407,590, filed on Sep. 16, 2022.

(51) Int. Cl.
*H01T 13/39* (2006.01)

(52) U.S. Cl.
CPC .................................. *H01T 13/39* (2013.01)

(58) Field of Classification Search
CPC ......... H01T 13/00; H01T 13/39; H01T 13/32; H01T 13/54
See application file for complete search history.

(56) References Cited

U.S. PATENT DOCUMENTS 4,540,910 A 9/1985 Kondo et al.
9,124,075 B2 * 9/2015 Yamada .................. H01T 13/32
(Continued)

FOREIGN PATENT DOCUMENTS

WO 0003463 A1 1/2000

OTHER PUBLICATIONS

International Search Report corresponding to application PCT/US2023/033093, dated Jan. 18, 2024, 4 pages.
(Continued)

*Primary Examiner* — Fatima N Farokhrooz
(74) *Attorney, Agent, or Firm* — Reising Ethington P.C.

(57) ABSTRACT

An igniter for a gas turbine engine has a shell; an insulator secured within said shell; a center electrode secured within said insulator and electrically isolated from said shell by said insulator, said center electrode having a firing tip formed from a platinum-iridium (PtIr) alloy and having a diameter of at least 0.09 inches; and a ground electrode mounting on said shell and terminating at a firing end of the igniter that is spaced from the firing tip by a gap, said ground electrode having at least one pin comprising ruthenium (Ru) or a ruthenium alloy. The igniter is advantageously used with an ignition system having a positive polarity pulse output.

12 Claims, 3 Drawing Sheets

(56) References Cited

U.S. PATENT DOCUMENTS

| | | | | |
|---|---|---|---|---|
| 10,859,058 | B1 * | 12/2020 | Rothenbuhler | F02P 13/00 |
| 11,621,544 | B1 * | 4/2023 | Konig | H01T 13/39 313/46 |
| 2002/0017847 | A1 | 2/2002 | Kato et al. | |
| 2002/0055318 | A1 | 5/2002 | Ishiguro | |
| 2011/0127900 | A1 | 6/2011 | Ma et al. | |
| 2011/0146227 | A1 * | 6/2011 | Mee | H01T 13/465 313/143 |
| 2012/0212119 | A1 * | 8/2012 | Ma | C22C 1/0466 419/28 |

OTHER PUBLICATIONS

Written Opinion corresponding to application PCT/US2023/033093, dated Jan. 18, 2024, 5 pages.

* cited by examiner

IGNITION SYSTEM AND IGNITER HAVING RUTHENIUM GROUND ELECTRODE AND PLATINUM-IRIDIUM ALLOY CENTER ELECTRODE

TECHNICAL FIELD

The present invention relates to igniters having precious metal electrodes.

BACKGROUND

It is known to use precious metal electrodes in igniters to provide the igniter with a long service life. This is advantageous for igniters used in aviation jet engines and for gas turbine engines more generally. Numerous alloys and combinations of platinum group metals have been proposed, and many used commercially. The long lasting performance of these electrodes is due to such inherent features as good working voltages, low electrical resistivity, high thermal conductivity, and good oxidation resistance that minimizes electrode erosion. For some applications of these precious metal electrodes, such as in automotive spark plugs, the material characteristics allow the electrode diameters to be reduced relative to more traditional plugs, thereby permitting use of less material (and thus, less cost) while reducing the sparking voltage required.

SUMMARY

In accordance with an aspect of the invention, there is provided an igniter for a gas turbine engine, comprising: a shell; an insulator secured within said shell; a center electrode secured within said insulator and electrically isolated from said shell by said insulator, said center electrode having a firing tip formed from a platinum-iridium (PtIr) alloy and having a diameter of at least 0.09 inches; and a ground electrode mounting on said shell and terminating at a firing end of the igniter that is spaced from the firing tip by a gap, said ground electrode having at least one pin comprising ruthenium (Ru) or a ruthenium alloy.

The igniter may include any of the following features alone or in any technically feasible combination:

- the firing tip has a diameter of 0.11-0.15 inches.
- the PtIr alloy comprises a mix of platinum and iridium in the range of Pt70Ir30 to Pt99Ir1.
- the PtIr alloy comprises a mix of platinum and iridium in the range of Pt80Ir20 to Pt95Ir5.
- the PtIr alloy comprises a mix of platinum and iridium in the range of Pt85Ir15 to Pt95Ir5.
- the ground electrode comprises a plurality of pins each having a diameter in the range of 0.022 inches to 0.122 inches.
- each of the pins comprises at least 99.9% ruthenium.
- the firing tip has a diameter of 0.12 inches, the PtIr alloy comprises Pt90Ir10, the pins have a diameter of 0.072 inches, and the ruthenium comprises at least 99.9% ruthenium.

In accordance with another aspect of the invention, there is provided an ignition system comprising the igniter of the preceding two paragraphs. The ignition system may further comprise a positive polarity exciter and an ignition lead connected at one end to the exciter and at another end to the igniter.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION

Figure 1:
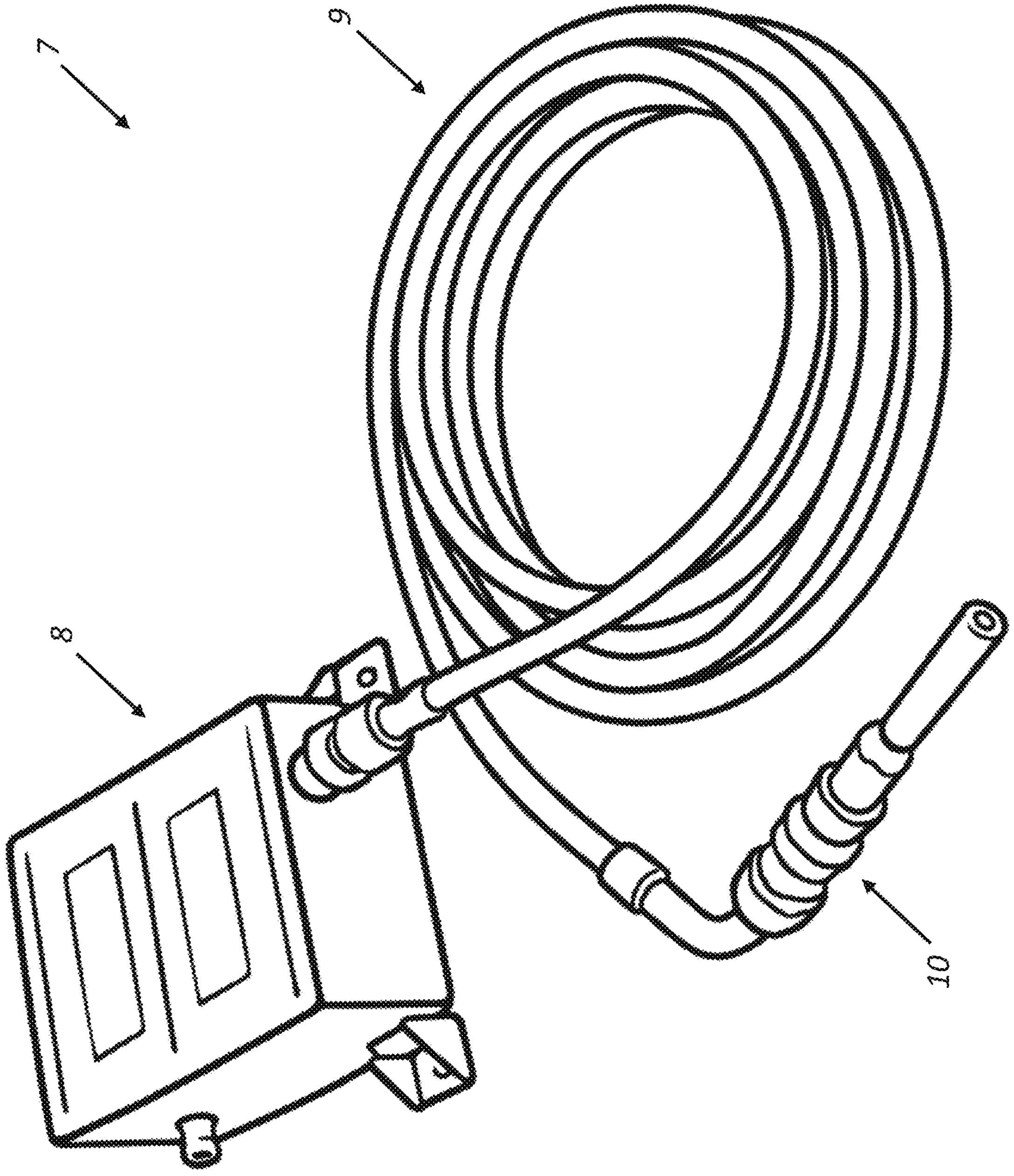
FIG. 1 shows a gas turbine ignition system that includes an exciter, ignition lead, and igniter constructed in accordance with an embodiment of the invention.

FIG. 1 shows a gas turbine ignition system 7 that includes an exciter 8, ignition lead 9, and igniter 10 constructed in accordance with an embodiment of the invention. Ignition system 7 is a positive polarity ignition system with exciter 8 comprising a unipolar positive polarity exciter that outputs only positive spark pulses for delivery via ignition lead 9 to the igniter 10.

Ignition system 7 may be implemented in various ways suitable for any of a number of different turbine engine applications, such as are used for commercial, business, and military aircraft, helicopters, industrial gas engines, and other turbine generators. The construction, operation, and use of commercially available positive polarity exciters and ignition leads for these different turbine engine applications are known and/or available to those skilled in the art, and will thus not be described in detail herein.

Figure 3:
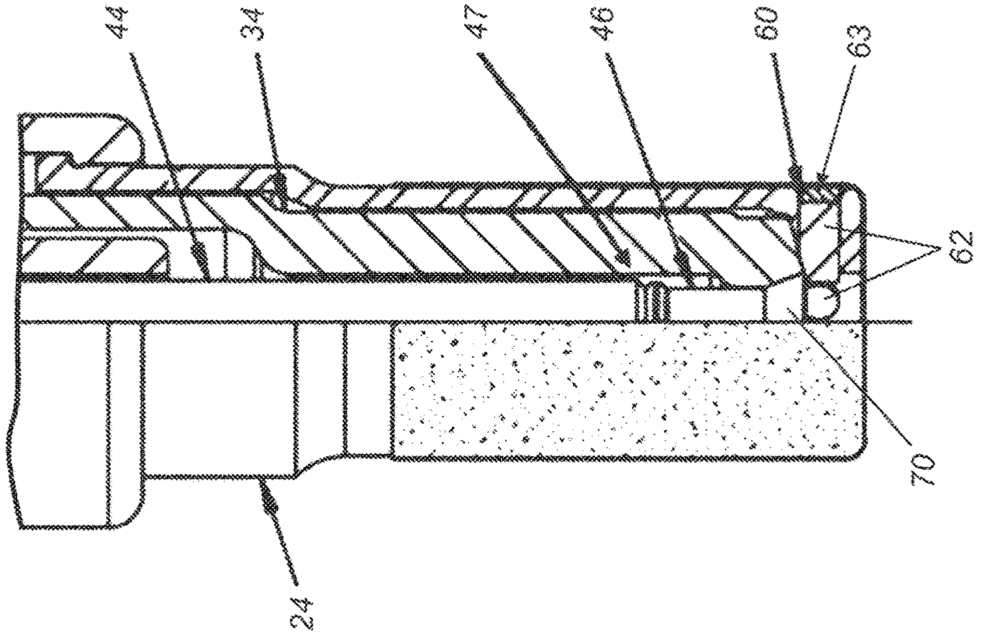
FIG. 3 is an enlarged view of the working end of the igniter of FIG. 2.
Figure 2:
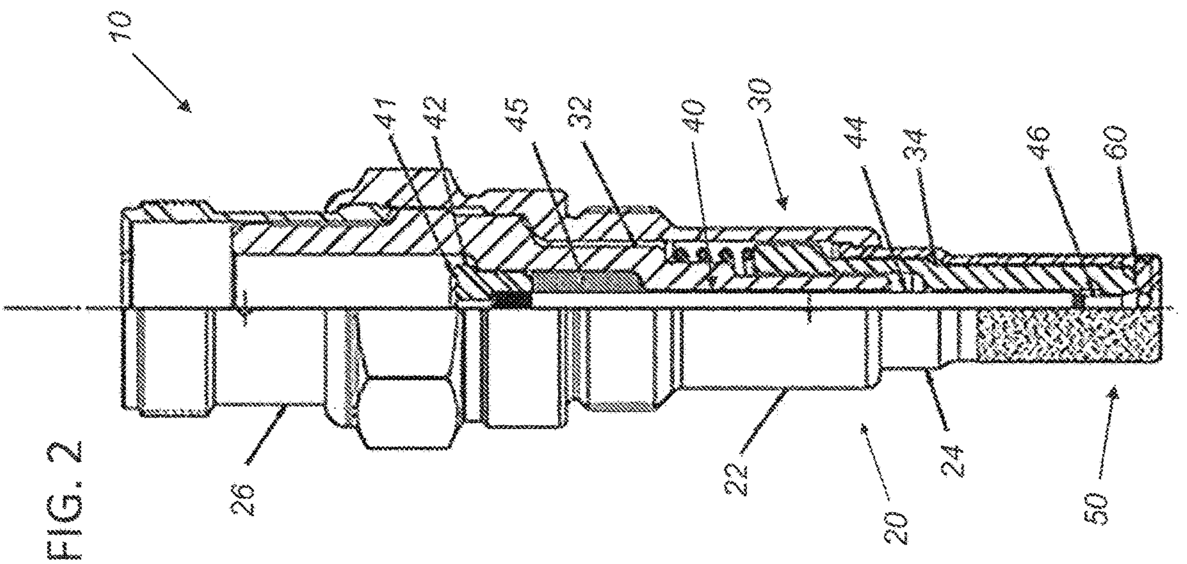
FIG. 2 is a partial cutaway of the igniter of FIG. 1.

As shown in FIG. 2, igniter 10 has a conventional construction with the exception of its ground and center electrodes. As will be appreciated by those skilled in the art, igniter 10 is of the type constructed for gas turbine engines, such as used for aviation applications in jet engines. Referring also to FIG. 3, igniter 10 includes a shell 20, insulator 30, and center electrode (CE) 40 that extends through the center of the shell 20 and insulator 30 down to a working or firing end 50 that includes a firing tip (or pin) 46 and a ground electrode (GE) 60 that is separated from the firing tip by a gap.

Shell 20 includes an upper shell 22, lower shell 24, and bushing 26 each made from a suitable metal or metal alloy such as stainless steel, which can be the same or different for each of the components 22-26. The upper and lower shells 22, 24 are connected physically and electrically by an interference fit at the lower end of upper shell 22 and the upper end of lower shell 24 via mating shoulders at an overlapping region of the two shells, as shown in FIG. 2 and as known in the art. Similarly, the bushing 26 is connected physically and electrically to the upper shell 22 by being crimped or otherwise fit at its lower end within the upper portion of upper shell.

Insulator 30 comprises an upper insulator 32 and lower insulator 34 which may each be made of ceramic or other suitable non-electrically conductive material. The lower portion of upper insulator 32 fits within the upper portion of lower insulator 34 as shown, and by a sufficient length to prevent any discharge between the center electrode 40 and shell 20 across the mating surfaces of the insulators.

Center electrode 40 includes an upper end having an ignition cable contact 41 made of tungsten or other suitable electrically-conductive metal or alloy. The contact 41 is connected to an electrode cap 42 made from stainless steel or other suitable electrically-conductive metal or alloy. A center electrode rod 44 made of ASTM F15 (Kovar™) or the like is threaded, welded, crimped, or otherwise connected to the electrode cap 42 and is surrounded at its upper end below the cap 42 by a glass seal 45. Referring more particularly to FIG. 3, at the lower end of center electrode 40, a precious metal firing tip 46 is welded, brazed, or otherwise suitably affixed at a joint 47 to the lower end of center electrode rod 44. Each of the aforementioned center electrode components 41-47 are connected electrically such that spark energy applied to the igniter 10 via ignition cable 9 from exciter 8 is able to travel through the center electrode 40 and spark between the CE firing tip 46 and ground electrode 60.

As also shown in FIG. 3, ground electrode 60 comprises a plurality of precious metal pins 62, two of which are shown. For igniter 10, six such pins 62 are spaced equally around the circumference of the lower end of lower shell 24 and extend radially inwardly towards the radial center of the shell 24 (and the center axis of the center electrode 40), terminating proximate the edge of an opening in the lower insulator 34. It is through this opening that a spark may jump between the CE firing tip 46 and one or more of the ground electrode pins 62 through a space 70 that is open to the exterior environment of the igniter so as to initiate combustion of an air/fuel mixture within an internal combustion engine, such as a gas turbine engine. Each of the pins 62 extend radially inwardly within a through hole in the lower shell 24 that aligns the pins 90° relative to the center axis of the center electrode assembly. The pins 62 are brazed, then welded in place to the lower shell 24 by an exterior facing weld 63. It will be appreciated that other arrangements of the ground electrode 60 are possible, including angling of the ground electrode pins 62 at angles other than 90° relative to the center axis of the center electrode 40, angling the pins 62 such that they do not intersect with the center axis, and use of more or less pins 62.

As will be understood by those skilled in the art, igniter 10 receives high voltage pulses from exciter 8 sufficient to spark between the CE firing tip 46 and one or more of the ground electrode pins 62. These pulses are delivered to igniter 10 via ignition lead 8 which, in accordance with its conventional construction, includes a center conductor and metal coaxial braid, foil, or other shield that is separated from the center conductor by an insulator. In the illustrated embodiment, the exciter 8 is connected to the ignition lead 9 with its coaxial shield being connected electrically to the exciter's output ground terminal and its center conductor connected to the exciter's spark output terminal. The other end of ignition lead 9 is mechanically and electrically connected to the igniter 10 such that its shell 20, and thus the ground electrode pins 62, are electrically connected to the coaxial shield, while the center electrode 40, and thus the CE firing tip 46, is electrically connected to the center conductor of the ignition lead 9.

Since exciter 8 is a positive polarity exciter, it outputs a high voltage, positive polarity pulse (relative to the grounded coaxial shield) onto the center conductor of the ignition lead 9. As a result, the igniter 10 receives and conducts the high voltage, positive polarity pulse to its CE firing tip 46 such that it generates a positive polarity spark across the gap between the firing tip 46 and one or more of the ground electrode pins 62.

Figure 4:
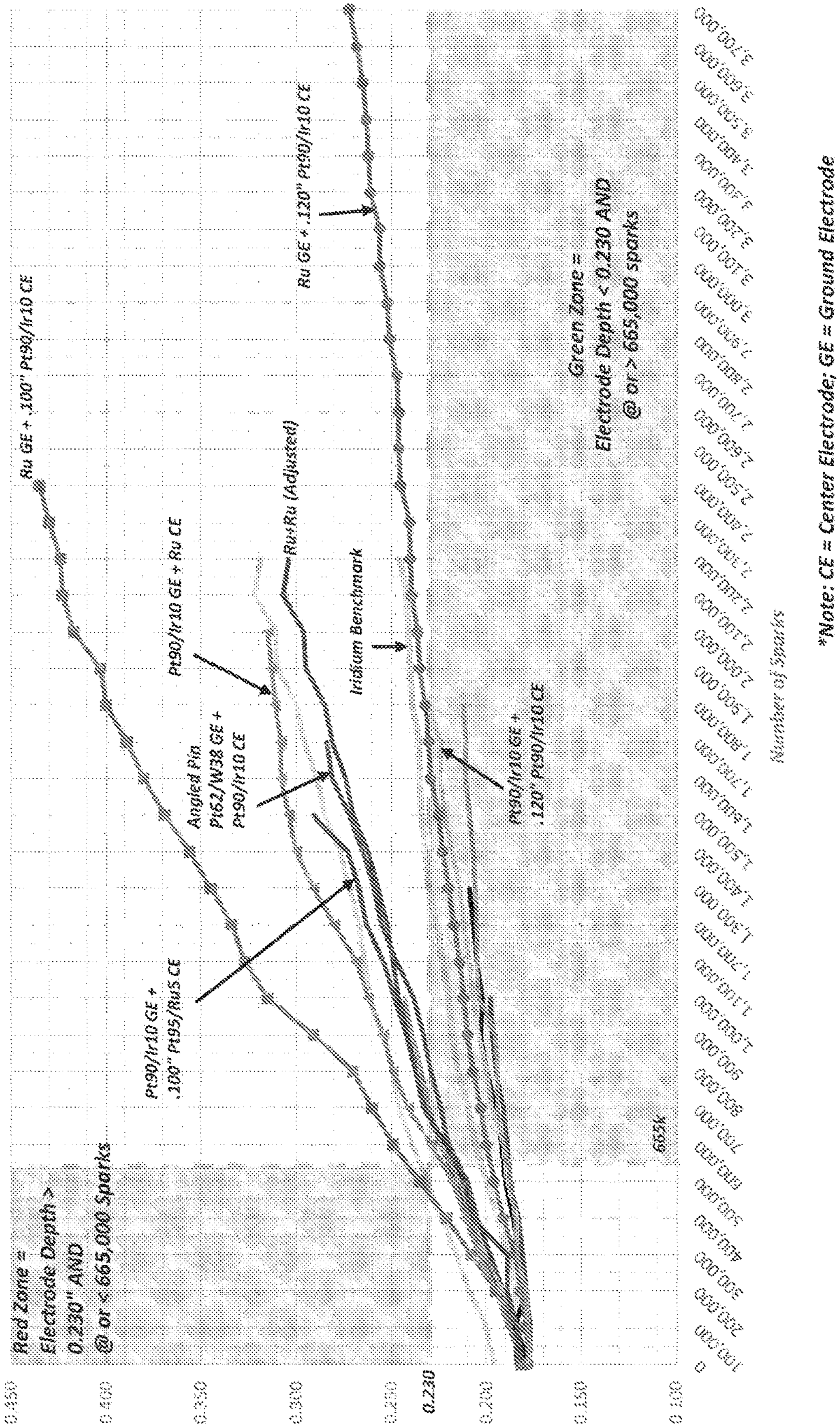
FIG. 4 is a chart comparing various igniters having different combinations of ground electrode (ground electrode) and center electrode (center electrode) materials and diameters.

Igniter 10 uses a combination of platinum group metals/alloys for the CE firing tip 46 and ground electrode pins 62 that, in conjunction with particular dimensions of the firing tip 46, have been found through testing to exhibit a surprisingly long service life. Referring now to FIG. 4, there is shown a graph that includes test results indicative of lifetime characteristics of a number of different firing tip metals and dimensions. This lifetime characteristic is demonstrated by a plot of the center electrode depth into the insulator versus the total number of sparks before failure. The center electrode depth begins at about. 18" (inches) and increases over the life of the igniter due to erosion of the firing tip 46. A red zone indicates an undesirable amount of electrode erosion early in the igniter's life, whereas a green zone indicates a preferred operating combination of low erosion and high number of sparks. Testing was conducted while the igniter tip was being exposed at 75 psig and 1,500° F. Note that the lifetime sparking numbers captured (~2M to 3M sparks) under those conditions are significantly less than they would be if the sparking were done at ambient pressure and temperature.

Twelve different center electrode and ground electrode material combinations are shown in FIG. 4, with several labelled and three containing data point markers for easy review. Of those three, the triangle data point line representing an igniter having a center electrode tip of Pt90Ir10 (90% platinum by weight, 10% iridium by weight) and ground electrode pins of Ru (99.9% or more pure ruthenium) shows a greater than average amount of electrode erosion (>0.300 electrode depth), but a better than average spark lifetime (2,000,000 sparks before failure). Switching the materials between the center electrode and ground electrode, as indicated by the curve marked with square data points, shows even greater electrode wear (>0.430 electrode depth), yet still a greater improvement in total spark lifetime (2.4M sparks). This test was done using a 0.100" diameter center electrode of the Pt90Ir10 alloy.

Further testing showed, surprisingly, that a combination of Ru for the ground electrode pins and Pt90Ir10 alloy for the center electrode pin in a larger 0.120" diameter center electrode dramatically improved the lifetime (3.7M sparks), while keeping the electrode erosion to a minimum (0.270 electrode depth). This is shown by the circle data point curve in FIG. 4. This unexpectedly advantageous performance appears to result from not just the combination of Ru for the ground electrode pins and Pt90Ir10 for the center electrode pin, but also from the use of a larger (0.120") center electrode diameter. Without desiring to be limited to any theory of operation or explanation, it is believed that the performance advantage arises in part due to the unipolar positive spark voltage applied to the plug (with ground electrode grounded) and the reduction in center electrode erosion due to its acceptance of electrons across the spark gap and its increased size.

Thus, a further combination of the ground electrode Ru material, center electrode PtIr material and increased diameter, as well as use of the igniter in a positive polarity ignition system permits for significantly longer service life of the igniter in a gas turbine or other internal combustion engine.

For the embodiment shown and described above, igniter 10 includes the CE firing tip 46 having a diameter of 0.12" and formed from Pt90Ir10, while the ground electrode has a diameter of 0.072" and formed of Ru. While these materials and the center electrode diameter are critical to the particular circle data point curve result shown in FIG. 4, other embodiments of the igniter can be made using PtIr alloys for the center electrode in a range of Pt70Ir30 up to Pt99Ir1, more preferably in the range of Pt80Ir20 to Pt95Ir5, and even more preferably closer to the tested Pt90Ir10 in the range of Pt85Ir15 to Pt95Ir5. Similarly, in some embodiments the Ru ground electrode can be made of suitable ruthenium alloys rather than pure or nearly pure ruthenium. Also, the center electrode pin can have other than the tested 0.12" diameter and, in some embodiments can be greater than or equal to 0.11" up to a technically or commercially viable maximum, or can be in a range about the tested 0.12" diameter, such as within a range of 0.09"-0.15". Although this range covers the square data point curve in FIG. 4, it will be appreciated that an igniter with those characteristics still can achieve a good sparking lifetime and thus be commercially acceptable. Also, the ground electrode pins 62 have a diameter of 0.072", but in other embodiments can be in the range of 0.022"-0.122".

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, igniter 10 may have different shell, insulator, and firing end constructions that use the above-describe Ru-based ground electrode and PtIr-based center electrodes for different applications such as gas turbine generators, automotive spark plugs, etc. Also, the alloys provided herein may include trace elements or, in some embodiments, include other elements in relatively minor amounts.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. An igniter for use with a positive polarity exciter of a gas turbine engine, comprising:
- a shell;
- an insulator secured within said shell;
- a center electrode secured within said insulator and electrically isolated from said shell by said insulator, said center electrode having a firing tip formed from a platinum-iridium (PtIr) alloy that accepts electrons from the positive polarity exciter and having a diameter within a range that is about 0.12 inches; and
- a ground electrode mounted on said shell and terminating at a firing end of the igniter that is spaced from the firing tip by a gap, said ground electrode having at least one pin comprising ruthenium (Ru) or a ruthenium alloy and having a diameter in the range of 0.022 inches to 0.122 inches.

2. The igniter of claim 1, wherein the firing tip has a diameter of 0.11-0.15 inches.

3. The igniter of claim 1, wherein the PtIr alloy comprises a mix of platinum and iridium in the range of Pt70Ir30 to Pt99Ir1.

4. The igniter of claim 1, wherein the PtIr alloy comprises a mix of platinum and iridium in the range of Pt80Ir20 to Pt95Ir5.

5. The igniter of claim 1, wherein the PtIr alloy comprises a mix of platinum and iridium in the range of Pt85Ir15 to Pt95Ir5.

6. The igniter of claim 1, wherein the ground electrode comprises a plurality of pins each having a diameter of about 0.072 inches.

7. The igniter of claim 6, wherein each of the pins comprises at least 99.9% ruthenium.

8. An ignition system comprising the igniter of claim 1.

9. An igniter for a gas turbine engine, comprising:
- a shell;
- an insulator secured within said shell;
- a center electrode secured within said insulator and electrically isolated from said shell by said insulator, said center electrode having a firing tip formed from a platinum-iridium (PtIr) alloy and having a diameter of at least 0.09 inches; and
- a ground electrode mounted on said shell and terminating at a firing end of the igniter that is spaced from the firing tip by a gap, said ground electrode having at least one pin comprising ruthenium (Ru) or a ruthenium alloy;
- wherein the firing tip has a diameter of 0.12 inches, the PtIr alloy comprises Pt90Ir10, the pins have a diameter of 0.072 inches, and the ruthenium comprises at least 99.9% ruthenium.

10. The ignition system of claim 8, further comprising a positive polarity exciter and an ignition lead connected at one end to the exciter and at another end to the igniter.

11. The ignition system of claim 10, wherein:
- the PtIr alloy comprises a mix of platinum and iridium in the range of Pt70Ir30 to Pt99Ir1; and
- the ground electrode comprises a plurality of pins each comprising at least 99.9% ruthenium and having a diameter in the range of 0.022 inches to 0.122 inches.

12. An ignition system, comprising:
- a unipolar positive polarity exciter that outputs positive polarity spark pulses;
- an ignition lead that connects to the exciter to receive and transmit the spark pulses; and
- an igniter that connects to the ignition lead to receive the spark pulses from the exciter, wherein the igniter comprises:
  - a shell;
  - an insulator secured within said shell;
  - a center electrode secured within said insulator and electrically isolated from said shell by said insulator, said center electrode having a firing tip formed from a platinum-iridium (PtIr) alloy and having a diameter of at least 0.10 inches; and
  - a ground electrode mounted on said shell and terminating at a firing end of the igniter that is spaced from the firing tip by a gap, said ground electrode having at least one pin comprising ruthenium (Ru) or a ruthenium alloy;
- wherein the center electrode firing tip and at least one ground electrode pin form a spark gap across which electrons from the positive polarity spark pulses are received by the PtIr firing tip from the at least one Ru or Ru-alloy pin; and wherein the igniter provides an extended service life from a combination of (1) the applied positive polarity spark pulses to the igniter, (2) the use of PtIr alloy for the firing tip, (3) the use of Ru or Ru alloy for the at least one pin, and (4) the firing tip having a diameter of at least 0.10 inches.

* * * * *